United States Patent
Ko et al.

(10) Patent No.: US 10,118,132 B2
(45) Date of Patent: Nov. 6, 2018

(54) INSPECTION APPARATUS OF ELECTROLYTE MEMBRANE

(71) Applicants: Hyundai Motor Company, Seoul (KR); Kia Motors Corporation, Seoul (KR)

(72) Inventors: Jae Jun Ko, Gyeonggi-Do (KR); Hyun Young Pi, Gyeonggi-Do (KR); Kwi Seong Jeong, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 287 days.

(21) Appl. No.: 14/921,535

(22) Filed: Oct. 23, 2015

(65) Prior Publication Data

US 2016/0271566 A1 Sep. 22, 2016

(30) Foreign Application Priority Data

Mar. 18, 2015 (KR) .................. 10-2015-0037309

(51) Int. Cl.
*B01D 65/10* (2006.01)
*H01M 8/1004* (2016.01)
*H01M 8/04* (2016.01)

(52) U.S. Cl.
CPC ............ *B01D 65/102* (2013.01); *H01M 8/04* (2013.01); *H01M 8/1004* (2013.01); *B01D 2325/42* (2013.01)

(58) Field of Classification Search
CPC ........ G01M 3/00; G01M 3/26; B01D 65/102; B01D 2325/42; H01M 8/1004; H01M 8/04; G01N 3/12

USPC .......................... 73/40, 40.7, 865.8
See application file for complete search history.

(56) References Cited

U.S. PATENT DOCUMENTS

| 5,763,765 | A | 6/1998 | Lamont et al. |
| 6,679,101 | B1* | 1/2004 | Rohner ............... B01D 65/102 200/61.04 |
| 2005/0092070 | A1* | 5/2005 | Bhatti ................. G01M 3/045 73/40 |
| 2014/0030815 | A1* | 1/2014 | Park .................... G01N 31/221 436/163 |

FOREIGN PATENT DOCUMENTS

| JP | 10-0837904 | 6/2008 |
| KR | 10-2010-0017589 A | 2/2010 |
| KR | 10-0957367 | 5/2010 |
| KR | 10-0969065 | 7/2010 |
| KR | 10-2011-0058457 | 6/2011 |
| KR | 10-2014-0016076 | 2/2014 |

* cited by examiner

*Primary Examiner* — Manish S Shah
*Assistant Examiner* — Suman K Nath
(74) *Attorney, Agent, or Firm* — Mintz Levin Cohn Ferris Glovsky and Popeo, P.C.; Peter F. Corless (57) ABSTRACT

An inspection apparatus of an electrolyte membrane is provided. The apparatus includes a lower supporter having a gas line through which gas flows or a concave portion that stores the gas. An upper supporter is disposed at an upper side of the lower supporter, and includes an opening. A membrane-electrode assembly is disposed between the lower supporter and the upper supporter. An upper cover covers an upper portion of the opening, and is formed with a plurality of partitions. An exhaust port is formed at the upper supporter to exhaust deionized water.

10 Claims, 8 Drawing Sheets

INSPECTION APPARATUS OF ELECTROLYTE MEMBRANE

CROSS-REFERENCE TO RELATED APPLICATION

This application claims priority to and the benefit of Korean Patent Application No. 10-2015-0037309 filed in the Korean Intellectual Property Office on Mar. 18, 2015, the entire contents of which are incorporated herein by reference.

BACKGROUND (a) Field of the Invention

The present invention relates to an inspection apparatus of an electrolyte membrane, and more particularly, to an inspection apparatus of an electrolyte membrane that quantitatively measures a position and size of a pinhole formed at an electrolyte membrane of a fuel cell stack.

(b) Description of the Related Art

As is generally known, a fuel cell system is a type of power generation system that directly converts chemical energy of a fuel to electrical energy. In a fuel cell stack that is applied to a fuel cell vehicle, unit cells are continuously arranged (e.g., stacked), and a Membrane-Electrode Assembly (MEA) is disposed at the innermost of each unit cell. The MEA is formed with an electrolyte membrane that moves protons, and a catalyst layer, i.e., a cathode and an anode, which is coated for reaction of hydrogen and oxygen at respective surfaces of the electrolyte membrane.

Generally, the electrolyte membrane is formed of a perfluorosulfonic acid-based material, and a very thin membrane (e.g., about 10-30 micrometers) is used to decrease ion conductivity influencing performance of the fuel cell. A gas diffusion layer (GDL) is disposed at both sides of the membrane electrode assembly. A separating plate at which a flow field is formed is disposed extraneous to the gas diffusion layer to supply fuel and air to the cathode and the anode and discharge water generated by the chemical reaction. Sub-gaskets are disposed at both sides of the catalyst layer and are used to handle the membrane-electrode assembly.

When the fuel cell stack is operated long-term under an abnormal situation (e.g., when the temperature of the fuel cell stack is increased by non-uniform cooling of the fuel cell stack, or when the temperature of the fuel cell stack is increased by inverse voltage), thickness of the electrolyte decreases and thus air-tightness between hydrogen and air is deteriorated. Therefore, pinholes (e.g., apertures or bores) are formed at the electrolyte membrane. In particular, air directly contacts hydrogen due to the pinholes and a high temperature combustion reaction occurs. Therefore, the size of the pinhole increases, and thus the fuel cell stack is damaged.

Additionally, the pinholes may be generated in a manufacturing process of the electrolyte membrane, a bonding process of the catalyst layer and the gas diffusion layer, or a bonding process of the sub-gaskets. When the size of the pinholes is substantial, a worker may verify a position and size of the pinholes with the naked eye. However, when the size of the pinholes is very small (e.g., less than a predetermined size), the thickness of the electrolyte membrane decreases, or the electrolyte membrane is partially damaged, and thus, the worker cannot verify the position and size of the pinholes, a portion where the electrolyte membrane is decreasing, or a portion where the electrolyte membrane is partially damaged. Therefore, an inspection apparatus configured to quantitatively measure the pinholes, the portion where the electrolyte membrane is decreasing, or the portion where the electrolyte membrane is partially damaged is required.

The above information disclosed in this section is merely for enhancement of understanding of the background of the invention and therefore it may contain information that does not form the prior art that is already known in this country to a person of ordinary skill in the art.

SUMMARY

The present invention provides an inspection apparatus of an electrolyte membrane that may quantitatively measure pinholes formed at an electrolyte membrane, a portion where the electrolyte membrane is decreases (e.g., a thickness thereof decreases), or a portion where the electrolyte membrane is partially damaged.

An inspection apparatus of an electrolyte membrane according to an exemplary embodiment of the present invention may include: a lower supporter formed with a gas line configured to measure gas flow; an upper supporter disposed at an upper side of the lower supporter, and formed with an opening, wherein a membrane-electrode assembly may be disposed between the lower supporter and the upper supporter; and an upper cover configured to cover the opening of the upper supporter, and formed with a plurality of partitions, wherein an exhaust port may be formed at the upper supporter to exhaust deionized water.

A concave portion may be formed at a substantially center portion of the lower supporter, and the gas line may communicate with the concave portion. A lower gasket may be disposed between the lower supporter and the membrane-electrode assembly. An upper gasket may be disposed between the upper supporter and the membrane-electrode assembly. The lower gasket or the upper gasket may include fluorine or EPDM (ethylene propylene diene M-class) rubber. The partitions may be disposed with a substantially constant gap along a horizontal direction and a vertical direction and a ruler may be formed at the partitions.

A plurality of upper engagement bores may be formed at the upper supporter, and a plurality of lower engagement bores may be formed at a position that corresponds to the upper engagement bores in the lower supporter. A plurality of cover guide bores may be formed at the upper cover, and a plurality of cover engagement bores may be formed at positions that correspond to the cover guide bores in the upper supporter. The upper cover may be made of a transparent material.

Further, an inspection apparatus of an electrolyte membrane according to another exemplary embodiment of the present invention may include: a lower supporter formed with a deionized water inflow line through which deionized water may flow; an upper supporter disposed at an upper side of the lower supporter, and formed with an opening, wherein a membrane-electrode assembly may be disposed between the lower supporter and the upper supporter; and an upper cover configured to cover the opening of the upper supporter and formed with a plurality of partitions.

A concave portion may be formed at a substantially center portion of the lower supporter, and the deionized water inflow line may communicate with the concave portion. A deionized water exhaust line that communicates with the concave portion may be formed at the lower supporter. A lower gasket may be disposed between the lower supporter and the membrane-electrode assembly and an upper gasket may be disposed between the upper supporter and the membrane-electrode assembly. The lower gasket or the upper gasket may include fluorine or EPDM (ethylene propylene diene M-class) rubber. The partitions may be disposed with a substantially constant gap along a horizontal direction and a vertical direction and a ruler may be formed at the partitions.

A plurality of upper engagement bores may be formed at the upper supporter, and a plurality of lower engagement bores may be formed at a position that corresponds to the upper engagement bores in the lower supporter. A plurality of cover guide bores may be formed at the upper cover, and a plurality of cover engagement bores may be formed at positions that correspond to the cover guide bores in the upper supporter. The upper cover may be made of a transparent material.

According to an exemplary embodiment of the present invention, it may be possible to exactly determine a damaged portion of the electrolyte membrane by a measurement gas or deionized water flowing through the electrolyte membrane. Further, it may be possible to quantitatively measure a size of the damaged portion of the electrolyte membrane by measuring a deionized water level of the portion where the electrolyte membrane is damaged.

BRIEF DESCRIPTION OF THE DRAWINGS

The drawings are for reference in describing an exemplary embodiment of the present invention, so that it shall not be construed that the technical spirit of the present invention is limited to the accompanying drawings.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to clearly describe the present invention, portions that are not connected with the description will be omitted. Like reference numerals designate like elements throughout the specification. In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Hereinafter, an inspection apparatus of an electrolyte membrane according to an exemplary embodiment of the present invention will be described in detail with reference to accompanying drawings.

Figure 1:
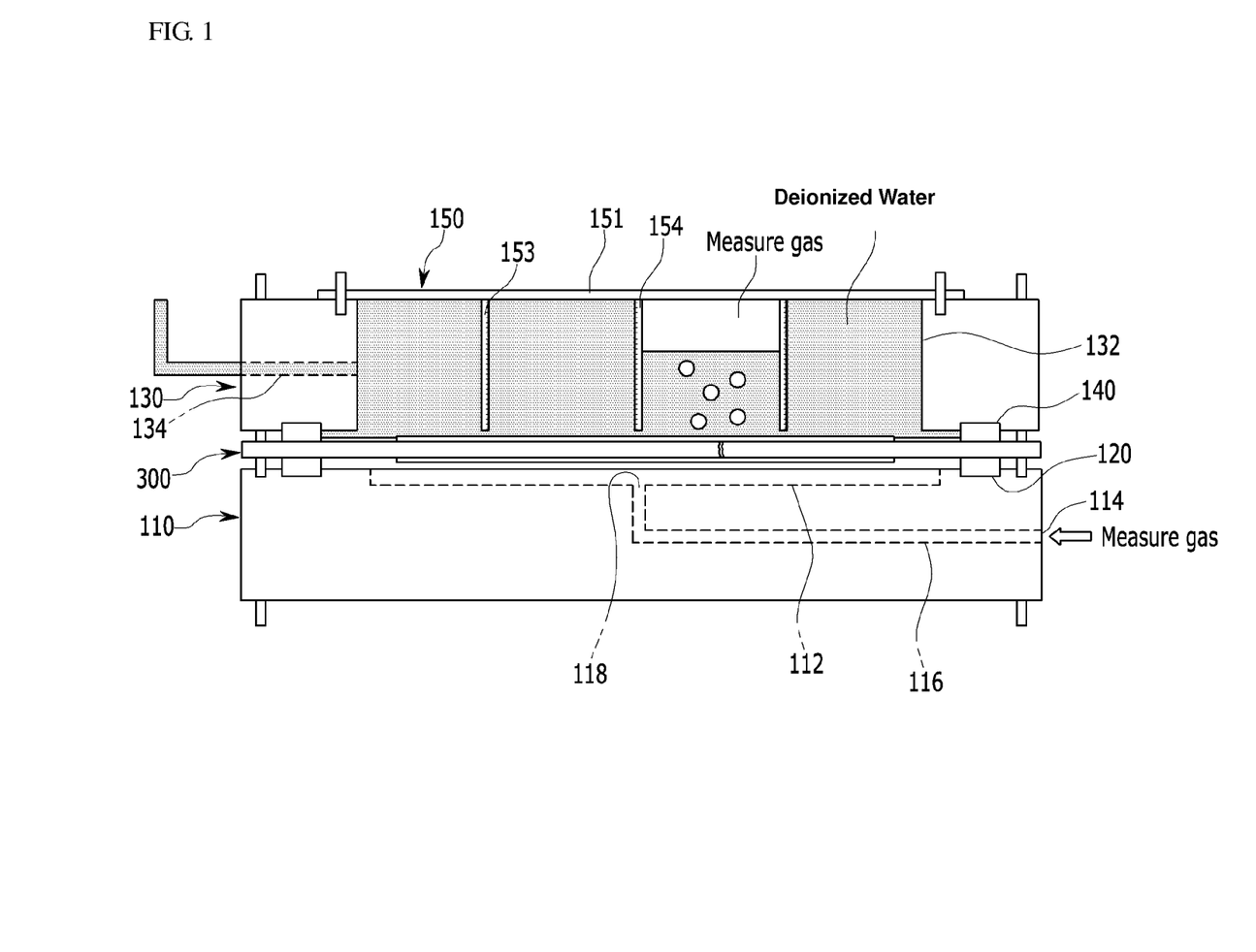
FIG. 1 is a view illustrating an inspection apparatus of an electrolyte membrane according to an exemplary embodiment of the present invention.

FIG. 1 is a view illustrating an inspection apparatus of an electrolyte membrane according to an exemplary embodiment of the present invention. As shown in FIG. 1, an inspection apparatus of an electrolyte membrane according to an exemplary embodiment of the present invention may include a lower supporter 110, an upper supporter 130 disposed at the upper portion of the lower supporter 110, and an upper cover 150 disposed at the upper portion of the upper supporter 130. A membrane-electrode assembly 300 may be disposed between the lower supporter 110 and the upper supporter 130.

Figure 2:
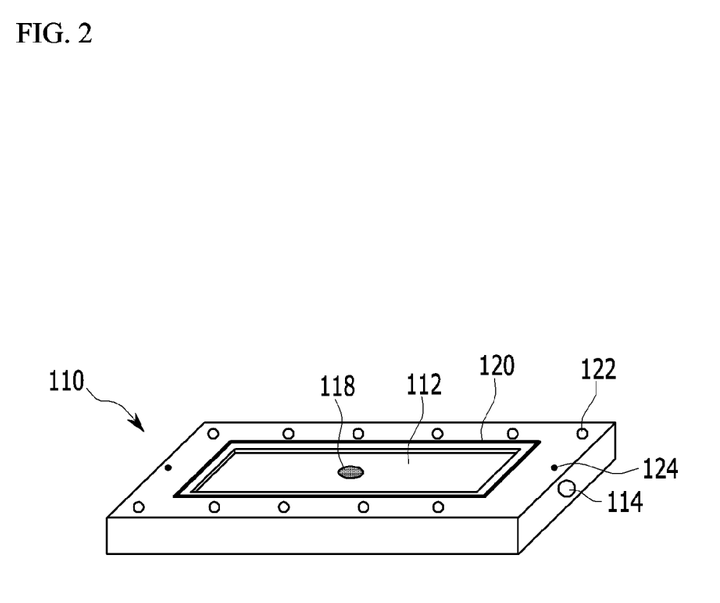
FIG. 2 is a view illustrating a lower supporter according to an exemplary embodiment of the present invention.

FIG. 2 is a view illustrating a lower supporter according to an exemplary embodiment of the present invention. As shown in FIG. 1 and FIG. 2, the lower supporter 110 may have a substantially rectangular shape, and a concave portion 112 may be formed at a substantially center portion of the lower supporter 110. A gas inlet 114 may be formed at a lateral side of the lower supporter 110, a gas line 116 may be formed to communicate with the gas inlet 114 at the lower supporter 110, and a gas outlet 118 may be formed to communicate with the gas line 116 at the concave portion 112. In FIG. 2, one gas outlet 118 may be formed however multiple gas outlets 118 may be formed at a constant interval. When multiple gas outlets 118 are formed at a constant interval, a pressure of measurement gas may be supplied to the membrane-electrode assembly 300 and thus a position of a pinhole may be measured more accurately.

The gas line 116 may be used to supply the measurement gas and may be configured to communicate with the concave portion 112 through the gas outlet 118. The measurement gas may be helium gas or nitrogen gas. Further, a lower gasket 120 may be disposed between the lower supporter 110 and the membrane-electrode assembly 300. In particular, the lower gasket 120 may be disposed along an outer edge of the concave portion 112 and may be a macromolecular gasket including fluorine or EPDM (ethylene propylene diene M-class) rubber. A plurality of lower engagement bores 122 may be formed at an outer side of the lower supporter 110. At least one lower guide bore 124 may be formed at the lower supporter 110.

Figure 3:
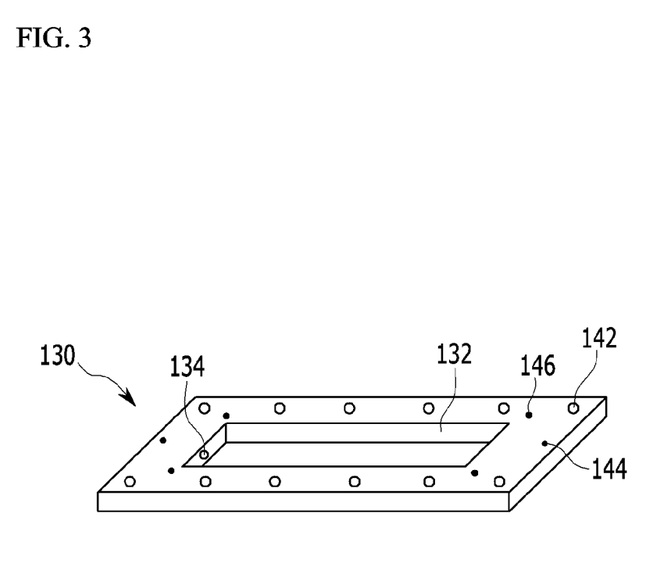
FIG. 3 is a view illustrating an upper supporter according to an exemplary embodiment of the present invention.

FIG. 3 is a view illustrating an upper supporter according to an exemplary embodiment of the present invention. As shown in FIG. 1 and FIG. 3, the upper supporter 130 may have a substantially rectangular shape, and an opening 132 having a rectangular shape may be formed at a center portion of the upper supporter 130. An exhaust port 134 may be formed at a lateral side of the upper supporter 130, and the exhaust port 134 may be configured to communicate with the opening 132.

Additionally, an upper gasket 140 may be disposed between the upper supporter 130 and the membrane-electrode assembly 300 (refer to FIG. 1). In particular, the upper gasket 140 may be disposed along an outer edge of the opening 132. The upper gasket 140 may be a macromolecular gasket including fluorine or EPDM (ethylene propylene diene M-class) rubber. A plurality of upper engagement bores 142 may be formed at an outer edge of the upper supporter 130. The plurality of upper engagement bores 142 may be formed at a position that corresponds to the lower engagement bores 122. A plurality of cover engagement bores 146 that engage the upper cover 150 may be formed at the upper supporter 130. At least one upper guide bore 144 may be formed at the upper supporter 130. The upper guide bore 144 may be formed at a position that corresponds to the lower guide bore 124.

Figure 4:
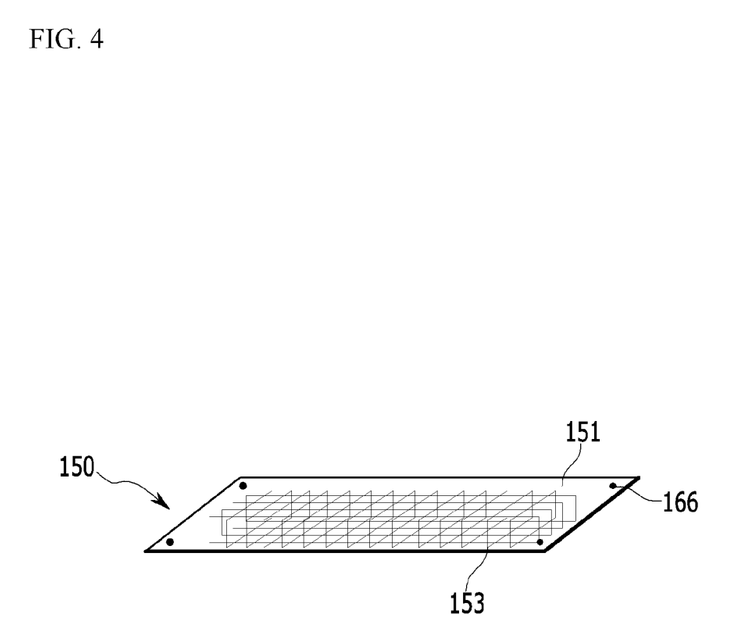
FIG. 4 is a view illustrating an upper cover according to an exemplary embodiment of the present invention.

FIG. 4 is a view illustrating an upper cover according to an exemplary embodiment of the present invention. As shown in FIG. 1 and FIG. 4, the upper cover 150 may include a cover 151 and a plurality of partitions 153 that protrude downward from the cover 151. The cover may have a flat shape and the upper cover 150 may be configured to cover an upper portion of the opening 132. The plurality of partitions 153 may be disposed with a substantially constant gap along a horizontal direction and a vertical direction of the cover 151. For a more accurate measurement, the cover 151 may be divided into more than 50 regions by the partitions 153. The cover 151 and the partition 153 may further be made of a transparent material such as glass, acryl, or polycarbonate and a plurality of rulers 154 may be formed at the partitions 153.

A plurality of cover guide apertures 166 may be formed at an outer edge of the cover 151. The cover guide apertures 166 may be formed at position that correspond to the cover engagement apertures 146. The cover 151 may be configured to cover an upper portion of the upper supporter 130, to allow verification or detection of a damaged portion of the membrane-electrode assembly 300 through the plurality of partitions 153.

Hereinafter, an operation of the inspection apparatus of the electrolyte membrane according to an exemplary embodiment of the present invention will be described in detail. First, an engagement method of the lower supporter 110, the upper supporter 130, and the upper cover 150 will be described, and an inspection process that verifies a damaged portion of the electrolyte membrane will be described.

Referring to FIG. 1 to FIG. 4, the membrane-electrode assembly 300 may be disposed between the lower supporter 110 and the upper supporter 130. An engagement bolt (not shown) may be passed through the upper engagement bore 142 of the upper supporter 130 and the lower engagement bore 122 of the lower supporter 110, and the engagement bolt may be fixed using a nut. The lower supporter 110 and the upper supporter 130 may thus be fixedly engaged.

Deionized water may be filled into the opening 132 of the upper supporter 130. Accordingly, leakage of deionized water may be prevented by the upper gasket 140 disposed between the upper supporter 130 and the membrane-electrode assembly 300. The upper cover 150 and the upper supporter 130 may be bolted by an engagement bolt (not shown) passed through the cover guide bore 166 of the upper cover 150 and the cover engagement bore 146. However, the present invention is not limited to bolt engagement and any other type of fastening mechanism may be used.

Furthermore, measurement gas may be supplied through the gas inlet 114. The pressure of the measurement gas may be about 0.1 to 1 bar. Leakage of the measurement gas may be prevented by the lower gasket 120 disposed between the membrane-electrode assembly 300 and the lower supporter 110. When a damaged portion of the electrolyte membrane such as a pinhole or substantially thin portion (e.g., having a predetermined thickness) is detected, the measurement gas may pass through the damaged portion and move toward the opening 132 of the upper supporter 130 filled with the deionized water. In other words, the measurement gas may pass through the damaged portion of the membrane-electrode assembly 300, and bubbles of the measurement gas may be generated in the deionized water.

A position of the damaged portion may be verified from a position where the bubbles of the measurement gas are generated, and a more accurate position of the bubbles may be verified from a space divided by the partitions 153. Since the upper cover 150 may be made of a transparent material, the generation position of the bubbles may be detected with the naked eye. The opening 132 may be divided into a plurality of spaces by the partitions 153 of the upper cover 150. The spaces may be filled with the deionized water. However, when the measurement gas passing through the damaged portion is increased, the deionized water level of the space where the damaged portion is positioned decreases.

Accordingly, the deionized water level may be measured by the ruler 154 formed at the partition 153. As a size of the damaged portion of the electrolyte membrane increases, the deionized water level decreases. Therefore, it may be possible to quantitatively determine the size of the damaged portion of the electrolyte membrane. Over-flow of deionized water caused by the measurement gas may be exhausted through the exhaust port 134 formed at the upper supporter 130.

Hereinafter, an inspection apparatus of an electrolyte membrane according to another exemplary embodiment of the present invention will be described in detail with reference to accompanying drawings.

Figure 5:
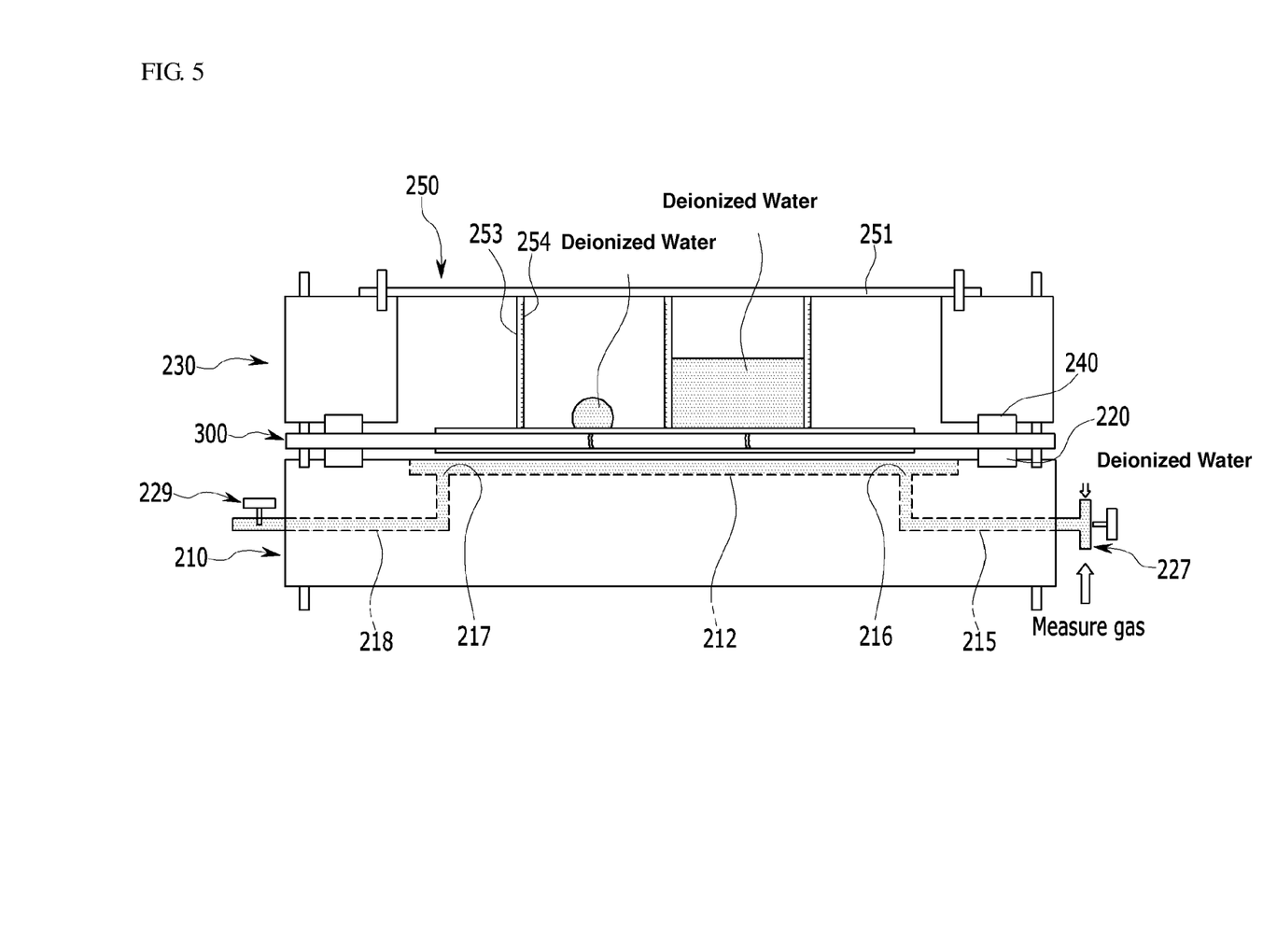
FIG. 5 is a view illustrating an inspection apparatus of an electrolyte membrane according to another exemplary embodiment of the present invention.

FIG. 5 is a view illustrating an inspection apparatus of an electrolyte membrane according to another exemplary embodiment of the present invention. As shown in FIG. 5, an inspection apparatus of an electrolyte membrane according to another exemplary embodiment of the present invention may include a lower supporter 210, an upper supporter 230 disposed at the upper portion of the lower supporter 210, and an upper cover 250 disposed at the upper portion of the upper supporter 230. A membrane-electrode assembly 300 may be disposed between the lower supporter 210 and the upper supporter 230.

Figure 6:
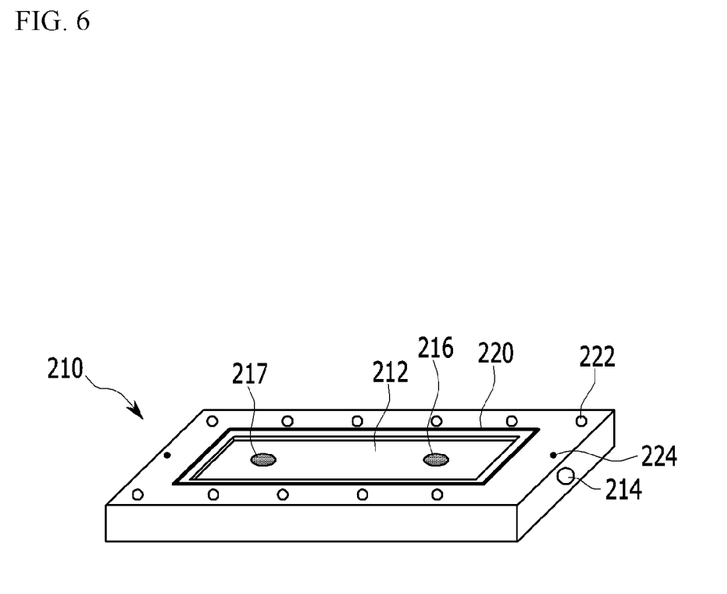
FIG. 6 is a view illustrating a lower supporter according to another exemplary embodiment of the present invention.

FIG. 6 is a view illustrating a lower supporter according to another exemplary embodiment of the present invention. As shown in FIG. 5 and FIG. 6, the lower supporter 210 may have a substantially rectangular shape, and a concave portion 212 may be formed at a substantially center portion of the lower supporter 210. A deionized water supply aperture 214 may be formed at one side of the lower supporter 210. A deionized water inflow line 215 that communicates with the deionized water supply aperture 214 may be formed in the lower supporter 210. A deionized water inlet 216 and a deionized water outlet 217 may be formed at the concave portion 212. A deionized water exhaust line 218 that communicates with the deionized water outlet 217 may be formed at the other side of the lower supporter 210.

Additionally, a three-way valve 227 may be disposed within the deionized water supply aperture 214. Deionized water and measurement gas may be selectively supplied to the concave portion 212 of the lower supporter 210 by the three-way valve 227. An exhaust valve 229 may be disposed at the deionized water exhaust line 218. The deionized water filled in the lower supporter 210 may be selectively exhausted to the exterior by the exhaust valve 229.

A lower gasket 220 may be disposed between the lower supporter 210 and the membrane-electrode assembly 300. In particular, the lower gasket 220 may be disposed along an outer edge of the concave portion 212. The lower gasket 220 may be a macromolecular gasket including fluorine or EPDM (ethylene propylene diene M-class) rubber. A plurality of lower engagement bores 222 may be formed at an outer side of the lower supporter 210. At least one lower guide bore 224 may be formed at the lower supporter 210.

Figure 7:
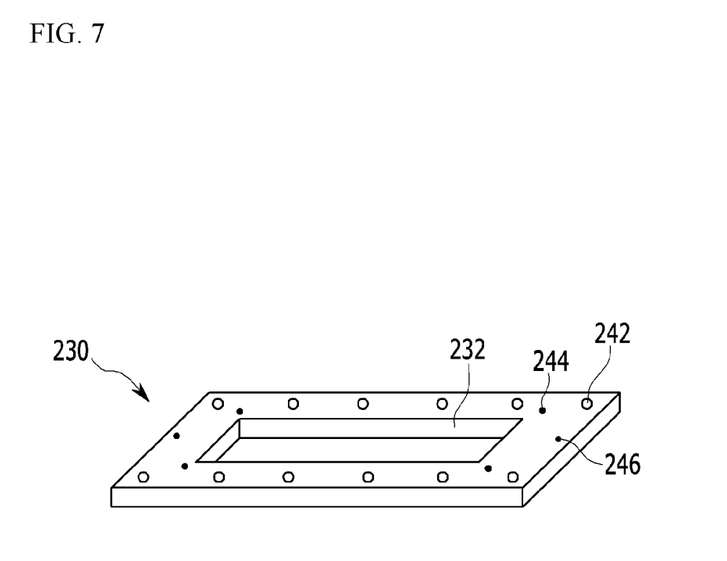
FIG. 7 is a view illustrating an upper supporter according to another exemplary embodiment of the present invention.

FIG. 7 is a view illustrating an upper supporter according to another exemplary embodiment of the present invention. As shown in FIG. 5 and FIG. 7, the upper supporter 230 may have a substantially rectangular shape, and an opening 232 having a rectangular shape may be formed at a substantially center portion of the upper supporter 230 (e.g., at about the center thereof).

An upper gasket 240 may be disposed between the upper supporter 230 and the membrane-electrode assembly 300 (refer to FIG. 5). In particular, the upper gasket 240 may be disposed along an outer edge of the opening 232 and may be a macromolecular gasket including fluorine or EPDM (ethylene propylene diene M-class) rubber. A plurality of upper engagement bores 242 may be formed at an outer edge of the upper supporter 230. The plurality of upper engagement bores 242 may be formed at a position that corresponds to the lower engagement bores 222. A plurality of cover engagement bores 244 for engaging the upper cover 250 may be formed at the upper supporter 230. At least one upper guide bore 246 may be formed at the upper supporter 230. The upper guide bore 246 may be formed at a position that corresponds to the lower guide bore 224.

Figure 8:
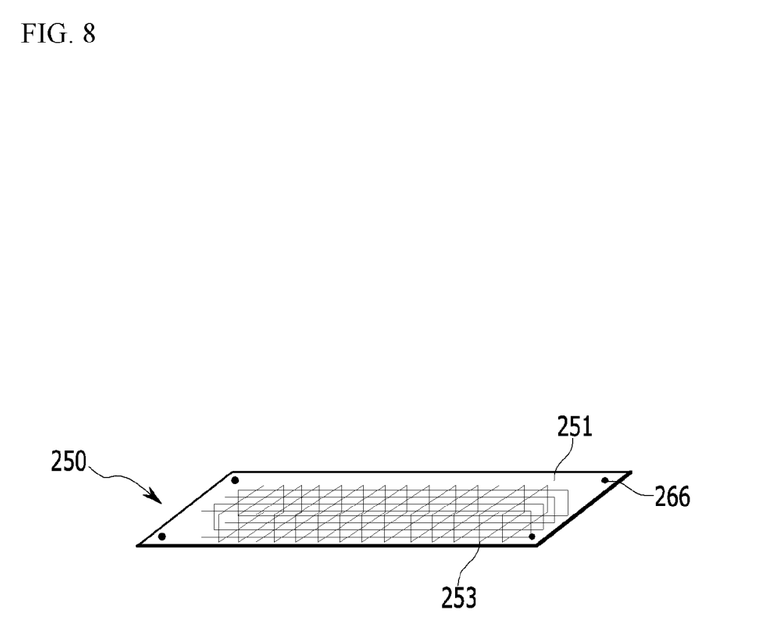
FIG. 8 is a view illustrating an upper cover according to another exemplary embodiment of the present invention.

FIG. 8 is a view illustrating an upper cover according to another exemplary embodiment of the present invention. As shown in FIG. 5 and FIG. 8, the upper cover 250 may include a cover 251 and a plurality of partitions 253 that protrude downward from the cover 251. In particular, the upper cover 250 may be configured to cover an upper portion of the opening 232. The plurality of partitions 253 may be disposed with a substantially constant gap along a horizontal direction and a vertical direction of the cover 251.

For a more accurate measurement, the cover 251 may be divided into over 50 regions by the partitions 253. The cover 251 and the partition 253 may be made of a transparent material such as glass, acryl, or polycarbonate and a plurality of rulers 254 may be formed at the partitions 253. A plurality of cover guide bores 266 may be formed at outer edges of the cover 251 and may be formed at positions that correspond to the cover engagement bores 244. The cover 251 may be configured to cover an upper portion of the upper supporter 230, to allow verification or detection of a damaged portion of the membrane-electrode assembly 300 through the plurality of partitions 253.

Hereinafter, an operation of the inspection apparatus of the electrolyte membrane according to another exemplary embodiment of the present invention will be described in detail. First, an engagement method of the lower supporter 210, the upper supporter 230, and the upper cover 250 will be described, and an inspection process that verifies a damaged portion of the electrolyte membrane will be described.

Referring to FIG. 5 to FIG. 8, the membrane-electrode assembly 300 may be disposed between the lower supporter 210 and the upper supporter 230. An engagement bolt (not shown) may be passed through the upper engagement bore 242 of the upper supporter 230 and the lower engagement bore 222 of the lower supporter 210, and the engagement bolt may be fixed using a nut. The lower supporter 210 and the upper supporter 230 may thus be fixedly engaged. The upper cover 250 and the upper supporter 230 may be bolted by an engagement bolt (not shown) passed through the cover guide bore 266 of the upper cover 250 and the cover engagement bore 246.

Deionized water may be supplied to the concave portion 212 of the lower supporter 210 by the three-way valve 227. When the concave portion 212 of the lower supporter 210 is filled with the deionized water, supplement of the deionized water may be stopped and measurement gas may be supplied to the concave portion 212. The measurement gas may be helium gas or nitrogen gas. Accordingly, leakage of the deionized water may be prevented by the lower gasket 220 disposed between the membrane-electrode assembly 300 and the lower supporter 210.

When pressure of the deionized water is increased by the measurement gas, the deionized water may move or flow toward the upper side of the membrane-electrode assembly 300 through the damaged portion such as the pinholes of the electrolyte membrane. Leakage of deionized water may be prevented by the upper gasket 240 disposed between the upper supporter 230 and the membrane-electrode assembly 300.

When the pressure of the deionized water is greater than a predetermined pressure due to the measurement gas, the deionized water may be exhausted by opening the exhaust valve 229. Accordingly, the damaged portion of the electrolyte membrane may be verified from the deionized water moved upward passing through the damaged portion. Further, since the upper cover 250 may be made of a transparent material, the generation position of the bubble may be determined with the naked eye.

The opening 232 may be divided into a plurality of spaces by the partition 253 of the upper cover 250. At an initial stage, the spaces may be empty. However, when the deionized water passing through the damaged portion of the membrane-electrode assembly 300 increases, the deionized water level of the space where the damaged portion is positioned increases. Thus, the deionized water level may be measured by the ruler 254 formed at the partition 253. When a size of the damaged portion of the electrolyte membrane is substantial, the deionized water may decrease. Therefore, it may be possible to quantitatively determine the size of the damaged portion of the electrolyte membrane.

DESCRIPTION OF SYMBOLS

110: lower supporter
112: concave portion
114: gas inlet
116: gas line
118: gas outlet
120: lower gasket
122: lower engagement bore
124: lower guide aperture
130: upper supporter
132: opening
134: exhaust port
142: upper engagement bore
144: upper guide bore
146: cover engagement bore
150: upper cover
151: cover
153: partition
154: ruler
166: cover guide bore
210: lower supporter
212: concave portion
214: deionized water supply aperture
215: deionized water inflow line
216: deionized water inlet
217: deionized water outlet
218: deionized water exhaust line
220: lower gasket
222: lower engagement bore
224: lower guide bore
230: upper supporter
232: opening
240: upper gasket
242: upper engagement bore
244: cover engagement bore
246: upper guide bore
250: upper cover
251: cover
253: partition
266: cover guide bore While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An inspection apparatus for damage of an electrolyte membrane, comprising:
a lower supporter formed with a gas line through which measurement gas flows or a concave portion that stores the measurement gas;
an upper supporter disposed at an upper side of the lower supporter, and formed with an opening, wherein a membrane-electrode assembly is disposed between the lower supporter and the upper supporter; and
an upper cover that covers an upper portion of the opening, and is formed with a plurality of partitions,
wherein an exhaust port is formed at the upper supporter to exhaust deionized water filled into the opening of the upper supporter, and
wherein the measurement gas forms bubbles in the deionized water and a position of the bubbles indicates a position of a damaged portion of the electrolyte membrane.

2. The inspection apparatus of the electrolyte membrane of claim 1, wherein the concave portion is formed at a center portion of the lower supporter, and the gas line communicates with the concave portion.

3. The inspection apparatus of the electrolyte membrane of claim 1, wherein a lower gasket is disposed between the lower supporter and the membrane-electrode assembly.

4. The inspection apparatus of the electrolyte membrane of claim 1, wherein an upper gasket is disposed between the upper supporter and the membrane-electrode assembly.

5. The inspection apparatus of the electrolyte membrane of claim 3, wherein the lower gasket or the upper gasket includes fluorine or EPDM (ethylene propylene diene M-class) rubber.

6. The inspection apparatus of the electrolyte membrane of claim 1, wherein the partitions are disposed with a constant gap along a horizontal direction and a vertical direction.

7. The inspection apparatus of the electrolyte membrane of claim 1, wherein a ruler is formed at the partitions.

8. The inspection apparatus of the electrolyte membrane of claim 1, wherein a plurality of upper engagement bores are formed at the upper supporter, and a plurality of lower engagement bores are formed at a position that corresponds to the upper engagement holes in the lower supporter.

9. The inspection apparatus of the electrolyte membrane of claim 1, wherein a plurality of cover guide bores are formed at the upper cover, and a plurality of cover engagement bores are formed at positions that corresponds to the cover guide bores in the upper supporter.

10. The inspection apparatus of the electrolyte membrane of claim 1, wherein the upper cover is made of a transparent material.

* * * * *